United States Patent [19]

Tapping et al.

[11] Patent Number: 5,384,842
[45] Date of Patent: Jan. 24, 1995

[54] PROGRAMMABLE TELEPHONE

[75] Inventors: Ian A. Tapping, Backwell; Stephen H. Colclough, Brentry, both of England

[73] Assignee: Chesilvale Electronics Limited, England

[21] Appl. No.: 777,402

[22] PCT Filed: Feb. 8, 1991

[86] PCT No.: PCT/GB91/00201
§ 371 Date: Dec. 5, 1991
§ 102(e) Date: Dec. 5, 1991

[87] PCT Pub. No.: WO91/12682
PCT Pub. Date: Aug. 22, 1991

[30] Foreign Application Priority Data

Feb. 8, 1990 [GB] United Kingdom ................. 9002850
Feb. 8, 1990 [GB] United Kingdom ................. 9002867

[51] Int. Cl.⁶ .................................................. H04M 1/60
[52] U.S. Cl. ................................. 379/387; 379/395; 379/421; 379/390
[58] Field of Search ............... 379/387, 391, 392, 395, 379/393, 421, 390, 162, 163

[56] References Cited

U.S. PATENT DOCUMENTS

| Re. 33,309 | 8/1990 | Walker, Jr. et al. | 379/395 |
| 4,451,706 | 5/1984 | Boeckmann | 379/393 |
| 4,571,461 | 2/1986 | Uno et al. | 379/390 |
| 4,843,621 | 6/1989 | Potratz | 379/390 X |
| 4,887,288 | 12/1989 | Erving | 379/389 X |
| 5,161,184 | 11/1992 | Smith et al. | 379/387 X |

FOREIGN PATENT DOCUMENTS

| 0098201 | 1/1984 | European Pat. Off. . |
| 3733717 | 4/1989 | Germany . |
| 89/11195 | 11/1989 | WIPO . |

OTHER PUBLICATIONS

Elektronik, vol. 32, No. 7, Apr. 1983, (Munich, DE), "ISSCC '83: Speigelt Produktentwick-lungen wider", pp. 12–14.

Telenorma Nachrichten, No. 92, 1988, (Frankfurt, DE), G. Einfalt: "Fernsprechapparate für ISDN-Hauptanschlüsse", pp. 28–34.

Nachrichtentechnik Elektronik, vol. 36, No. 6, 1986, (Ost-Berlin, DD), W. Ortmeyer: "Einsatz des Einchipmikrorechners U 8047 im Komfortfernsprechapparat apart 2510", pp. 223–225.

Siemens Telcom. Report, vol. 12, No. 3, May/Jun. 1989, (Berlin & Munich, DE), W. Krafft: "Digitales Freisprechen: ISDN-Komfort freihändig nutzen", pp. 90–93.

Electronic Design, vol. 36, No. 11, 12 May 1988, (Hasbrouck Heights, N.J., US), D. Morgan: "Create a simple but capable speakerphone and autodialer", pp. 133–136.

IEEE Journal of Solid-State Circuits, vol. 24, No. 3, Jun. 1989, IEEE, (New York, US), E. D. J. Moons et al.: "Fully integrated analog telephone", pp. 681–685.

Hitachi Review, vol. 33, No. 5, 1984, (Tokyo, JP), T. Kihara et al.: "8-Bit single-chip microcomputers", pp. 235–240.

Primary Examiner—James L. Dwyer
Assistant Examiner—Paul A. Fourner
Attorney, Agent, or Firm—Larson and Taylor

[57] ABSTRACT

A telephone includes an EEPROM memory (26) for storing data, and a microcontroller (14) for controlling operations. The EEPROM (26) contains data for different operating protocols, so that the telephone can be readily adapted for use in different telephone systems. The EEPROM (26) draws a (small) line current when the telephone is in use, but requires no current to maintain its memories, so no standby power is required. Particularly if the telephone is for use in noisy environments, there can a mute/boost feature (30) whereby the receiver gain is boosted and the microphone is simultaneously cut off. This may be effectuated by use of the EEPROM (26).

3 Claims, 5 Drawing Sheets

PROGRAMMABLE TELEPHONE

BACKGROUND OF THE INVENTION

1. Field of the Invention

The present invention relates to telephones. It relates particularly, but not exclusively, to test telephones.

2. Description of the Prior Art

A telephone that is to be manufactured for export to a number of countries must be adaptable to comply with the signalling and functional protocols used by the telephone exchanges of the various countries. Typically, a different protocol is required for each country. Techniques have been developed for adapting telephones to different systems. However, these techniques have involved long lead-times, high costs for each new protocol, and only limited scope for change once a protocol has been implemented.

Many telephones now are supplied with memory functions such as last number redial and storage of commonly used numbers. In known telephones, these functions have been implemented using volatile memory maintained by primary batteries, a small current drawn from the line, or secondary batteries and a small line current. Batteries are expensive and liable to cause data loss on discharge, and small line currents are undesirable and disallowed in some countries.

When a telephone is used in a high noise environment, hearing the received signal can be a problem: (a) because the ambient noise is heard in the receiver as side tone and (b) the noise break-through through the telephone handset and the user's skull and sinuses dominates the received signal.

If the gain of the receiver were increased with the microphone unmuted it would produce two problems: (a) amplifed side tone with no improvement in the signal to noise ratio; (b) the telephone would have a tendency to generate acoustic feedback.

Embodiments of the invention may enable one to ameliorate one or more of the above problems.

SUMMARY OF THE INVENTION

In one aspect, the present invention proposes a telephone incorporating an EEPROM memory (also written as E$^2$PROM memory) containing at least part of the firmware for implementing the signalling and functional protocol. The EEPROM is connected to a microcontroller which controls the operation of the component parts of the telephone. Preferably, more than one protocol is stored in the EEPROM memory during manufacture, any one of which is selectable without hardware re-configuration. Preferably part of the EEPROM memory is set aside for storage of information generated while the telephone is in service. Furthermore, the EEPROM memory may obtain all of its operating power for both memory entry and retrieval operations from the telephone line while off-hook. The EEPROM retains data when on-hook without any external or battery supply.

In another aspect the invention provides a telephone in which the problems caused by ambient noise are ameliorated, by providing a telephone having means whereby the gain of the receiver may be increased and the microphone simultaneously cut off. The desired signal is thereby boosted while the unwanted side tone is reduced or eliminated. Preferably, the degree of gain may be varied, possibly in a series of steps. This may be applicable to any telephone that may be used in a high noise environment or where extra gain is required for the hard of hearing in order to reduce side tone interference. A preferred telephone embodies both the first and second aspects, and both may then employ the EEPROM.

BRIEF DESCRIPTION OF THE DRAWINGS

Preferred embodiments of the present invention will now be described, by way of example, with reference to the accompanying drawings wherein.

DESCRIPTION OF THE PREFERRED EMBODIMENTS

Figure 1:
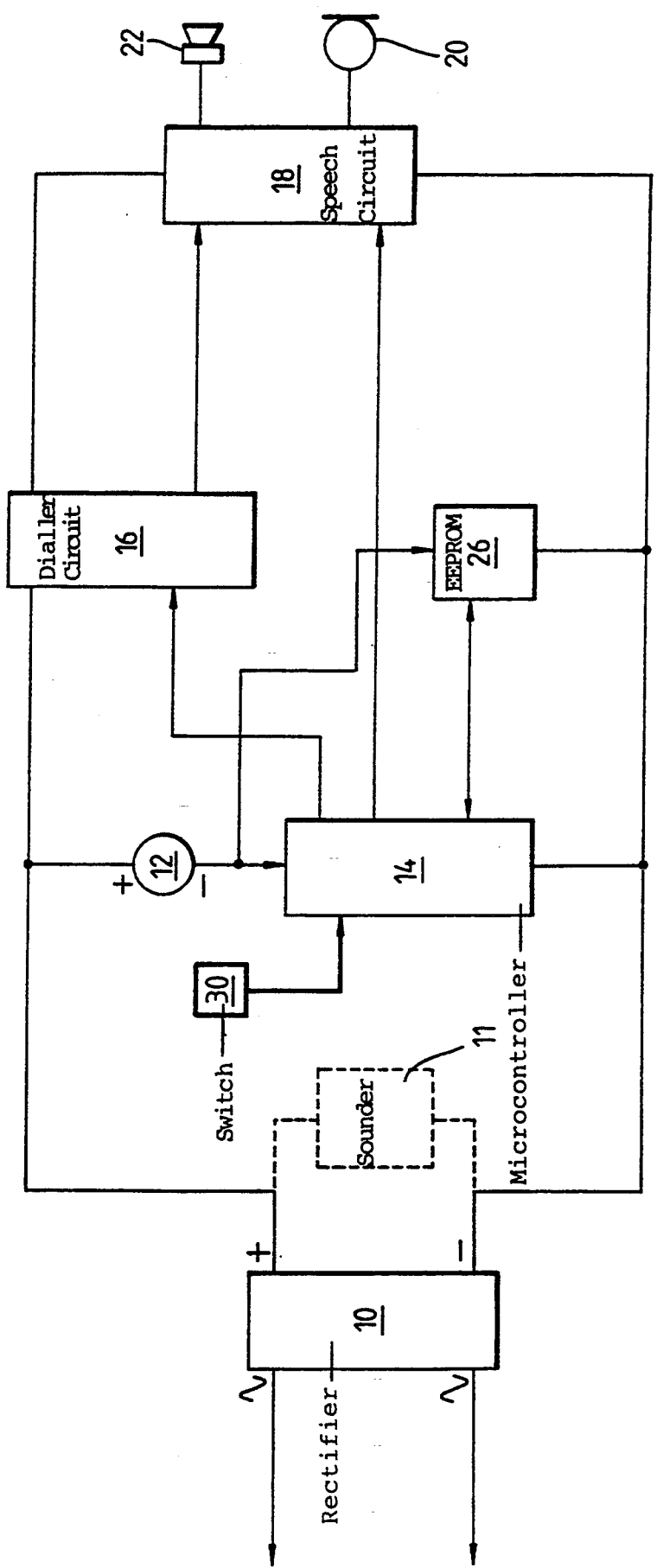
FIG. 1 shows a schematic diagram of a telephone which is an embodiment of the present invention.

The telephone shown in FIG. 1 is powered from the line by a supply of either polarity. This is effected by a rectifier 10, and the resulting DC current is used to power the active components of the telephone. A sounder 11 may be connected across the rectifier 10. A constant-current source 12 is provided to supply power to components that require a stable supply voltage. A microcontroller 14 is provided to control the operation of the telephone's circuits. These include a dialler circuit 16 and a speech circuit 18. A microphone 20 and a speaker 22 are connected to the speech circuit 18.

The firmware used by the microcontroller 14 is held in the microcontroller's program mask and in an EEPROM 26. The firmware in the EEPROM characterises signals sent by the microcontroller 14 to the dialler circuit 16 and the speech circuit 18, and thus the firmware can control many parameters relating to the dialling protocol. For pulse or loop-disconnect dialling these parameters may include, but are not limited to, pre-digit, inter-digit and post digit pause durations, make period, break period, keypad output coding and timed break period (flash). For tone or DTMF dialling, these may include, but are not limited to, tone duration, tone interval, microphone mute activation and hold-over period and the timed break period (flash). Also permanently recorded in the EEPROM may be data such as the serial number of the instrument, and an instrument identification number which may be transmitted when required. While the telephone is in use, the EEPROM may record such data as an incremental use counter and a last-number-redial store. Customer-programmable features may also be stored in the EEPROM, such as a repertory dialling store (e.g. 10-number, 21-digit) and a tone (DTMF) or pulse (loop-disconnect) dialling priority (i.e. into which mode the telephone should activate after each off-hook).

The EEPROM can be programmed to activate simple form call-barring, interrogating up to the first four digits dialled.

A "spare" option key is also described in the firmware and is reserved for features not yet designed but which will be realised in hardware and require to be activated by a soft button. Two protocols may be activated; either toggle-on, toggle-off or toggle on and time-out after a programmable period.

The microcontroller 14 mask program may include some operating system features such as default conditions, confidence tones for the user, invalid data rejection and operating protocols, sequencing counting etc.

The telephone has a 'mute/boost' feature to ameliorate the problems of ambient noise. This is actuable via-a control 30. The microcontroller 14 receives a signal from the control 30. This control may be e.g. a button on the telephone's keypad. The signal received by the microcontroller 14 is dependent on the state of the control 30, e.g. whether it is depressed or released.

When the control 30 is activated, the microcontroller 14 sends a signal to the speech circuit 18 to control the gain levels of the incoming and outgoing speech signals. The gain levels are controlled by a protocol as follows:

If the control 30 is activated for a short time, the microphone 20 is toggled between its muted and its normal state. The gain setting is not changed. It is thus possible to toggle between any muted gain setting and the unmuted state in a single step until the next on-hook when the memory is reset.

If the control 30 is activated for a longer period, the microphone 20 is muted and the gain of the speaker 22 is incremented by a single step. The gain setting is memorised until it is next incremented or the telephone is put into its on-hook state. Operation of the gain-increase command beyond the maximum setting will cause the instrument to revert to the normal gain setting.

A practical embodiment will now be described in more detail with reference to FIGS. 2 to 5. These show a device which is basically as in FIG. 1. In addition to the blocks shown in FIG. 1, there is a power-up reset circuit 13.

The basic functions of the telephone are performed by the speech circuit 18 and the dialler circuit 16 controlled by the microcontroller 14. The speech circuit 18 controls the following functions: the DC voltage and loop current, the impedance matching, separation of transmit and receive, side tone, transmission of DTMF to line at the correct level, automatic gain control to compensate for line length, muting of transmitter and receiver during dialling, limitation of maximum output signals to the receiver (acoustic shock) and the maximum signal transmitted to line by the microphone. A mute/boost feature is also incorporated in the speech circuit 18 and is controlled by the microcontroller 14.

Figure 5:
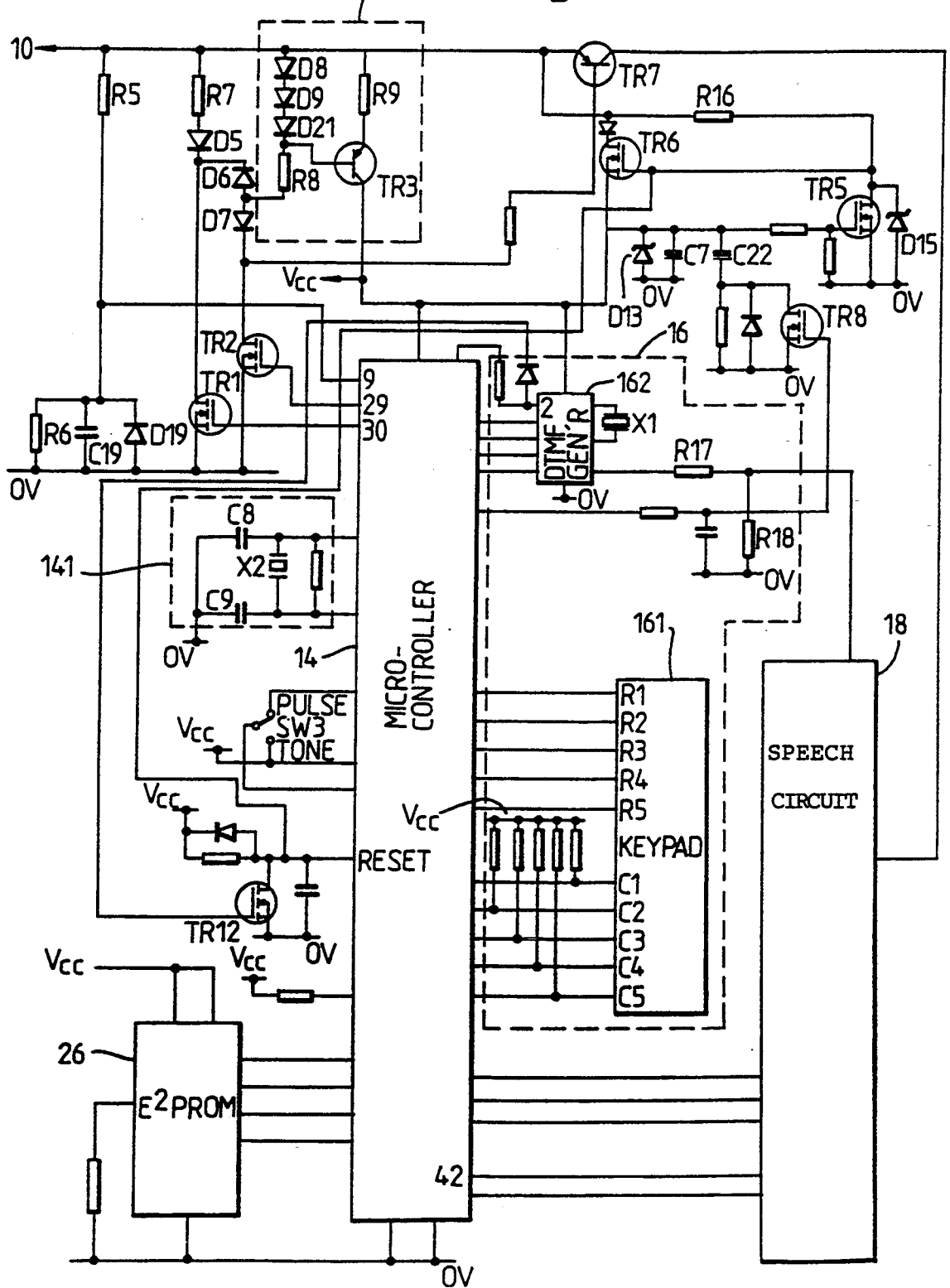
FIG. 5 shows an exemplary circuit structure of the constant-current source, the power-up reset circuit, the microcontroller, the dialler circuit and the EEPROM shown in FIG. 1.

The dialler circuit 16 is capable of sending both DTMF and loop disconnect dialling signals generated by a matrix type keypad 161 (see FIG. 5). It also can generate other functions such as timed break recall and disconnect. The operation of the dialler circuit 16 is controlled by the microcontroller 14, the $E^2$PROM 16 holds information for the microcontroller 14 to indicate what the function of each key on the keypad 161 is. This means that the number and type of functions that a telephone has can be programmed at the time of manufacture depending on the customer's requirements.

Dialling may be entered on the keypad 161 at any rate and is buffered by an internal memory within the microcontroller 14 and will be sent to line at the appropriate rate. During DTMF dialling, the microcontroller 14 will generate a mute signal in order to attenuate the receiver 22 and turn off the microphone 20. During pulse dialling a different type of mute signal is used, which is called Mask. This completely turns off the speech circuit 18 with a dummy load in the dialling circuit 16. The microcontroller 14 will then impulse this load is order to give loop disconnect pulsing to line. Pulse disconnect and DTMF dialling rates are also programmed into the $E^2$PROM 26 so that different standards in different countries can be catered for. DTMF tones are generated by the DTMF generator 162 (see FIG. 5) which uses crystal X1 to control the tone frequencies. The number previously dialled is stored in a last number redial memory in the EEPROM 26. If it is wished to redial a number, the user can go on hook, then off hook, and then press last number redial (LNR). The number is then redialled in the mode selected by a Tone/Pulse switch.

The whole circuit is kept polarity independent by the rectifier 10.

Figure 2:
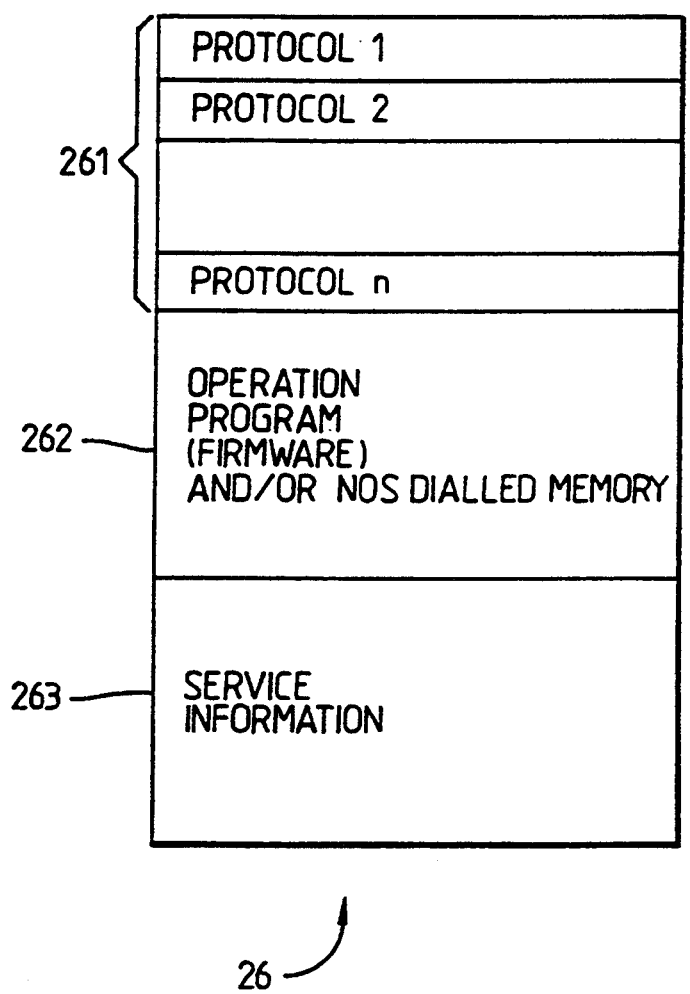
FIG. 2 shows the data structure in the EEPROM shown in FIG. 1.

As shown in FIG. 2, the EEPROM 26 has a multiplicity of regions 261 for storing data relating to different, selectable protocols (1–n). It may further have a region of operation program 262; this may be constituted by firmware. This may also store unchanging information such as the serial number, etc. There may also be an updatable region 263 for service information, last number redial store, etc.

Figure 3:
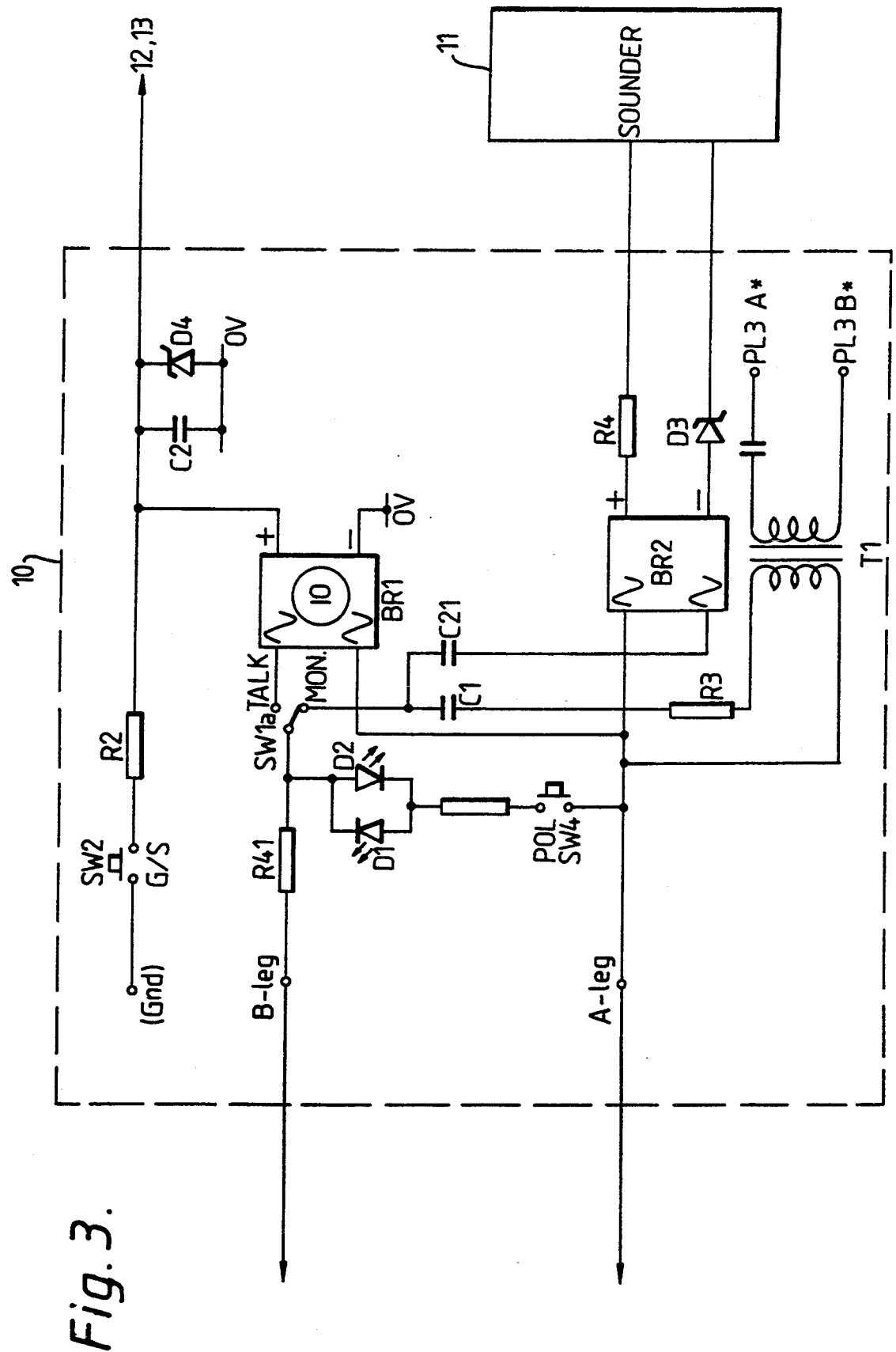
FIG. 3 shows an exemplary circuit structure for the rectifier and the sounder shown in FIG. 1.

FIG. 3 shows the circuitry associated with the rectifier 10. The tip wire (A leg) is at a positive voltage +ve and is connected to earth at the telephone exchange. The ring wire (B leg) is connected to a battery not shown) providing a negative voltage −ve (nom. 50 V). Connection Gnd is the local ground connection, derived via the connection cord or connection to the metal bell clip. Switch SW2 (G/S) applies the ground to the ring wire through the telephone circuit and R2 for the ground start operation on public telephone lines.

The tip and ring wires are connected to the bridge BR1 such that, independent of line polarity, the telephone will function.

A polarity test is available with LED's D1 and D2 to verify correct connection. SW4 (POL) is operated to complete this circuit. When on hook, MONITOR mode is automatically operational. Monitor is achieved via one pole of the TALK/MONITOR switch, R3 and C1 and a transformer T1 which presents a 10K ohm load to the line. The secondary of the transformer connects directly to the receiver. C1 is included as a DC block.

Ringing current passes through C21 to bridge rectifier BR2 and then to the sounder 11 via zener diode D3 and R4. D3 provides a 24 V standoff, ensuring that low voltages in monitor, such as speech, do not cause the sounder to bleep.

Zener D4 provides protection against fast transient voltages such as lightning-induced spikes up to 1500 V. This zener starts to operate typically at voltages in excess of 164 V.

Figure 4:
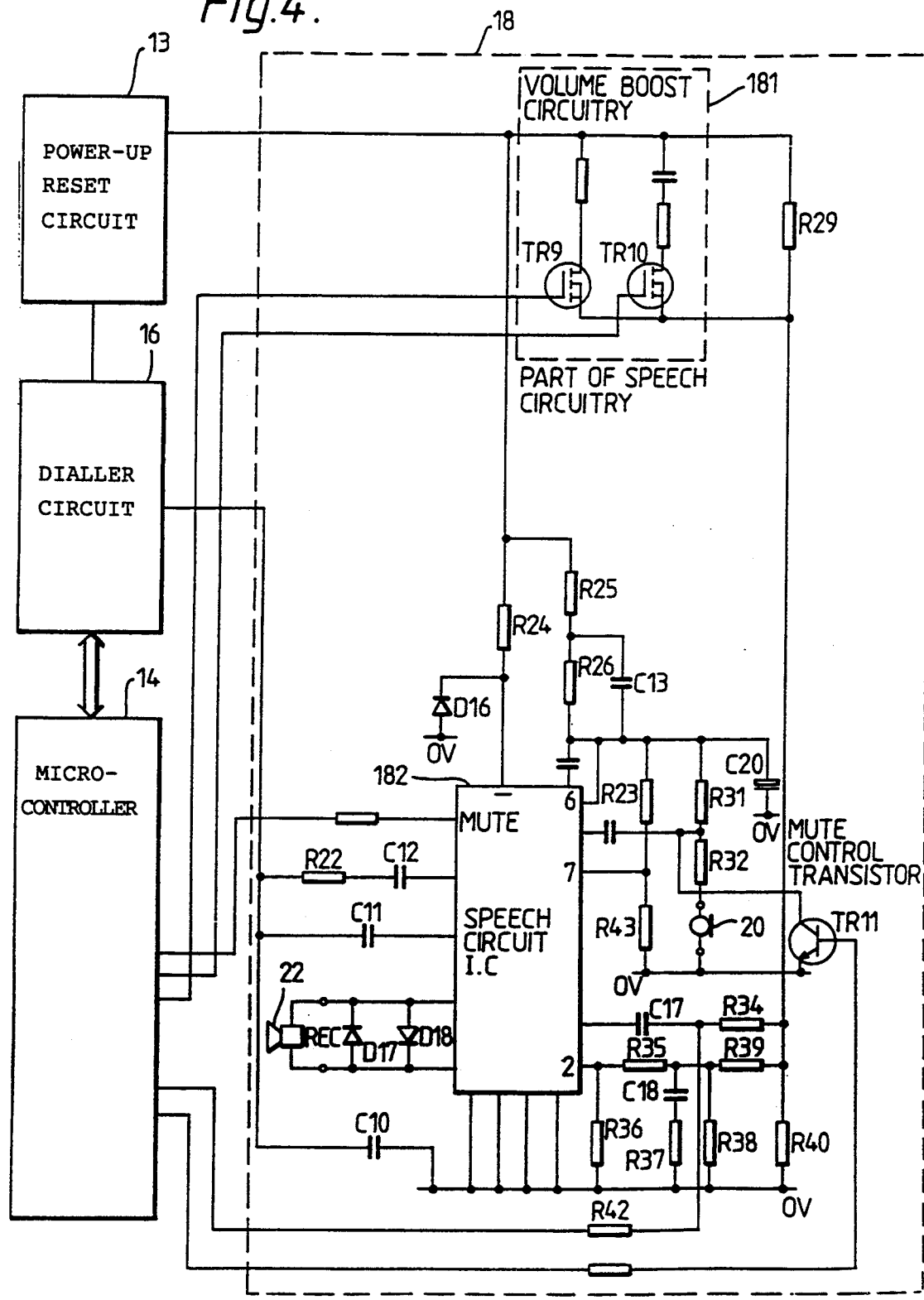
FIG. 4 shows an exemplary circuit structure of the speech circuit shown in FIG. 1.

FIG. 4 shows the speech circuit 18. When the telephone is off-hook, a DC current will flow from Pin 1 to Pin 2 of the speech ic 182. The voltage across the telephone terminals will be determined by fixed voltage drops and variable drops across the resistances in series. The series resistances are: R24 and R36 (the slope resistor). Each of these will contribute to the voltage drop proportional to the current flowing.

The tone output from the DTMF generator 162 is fed to the potential divider consisting of R17 and R18 shown in FIG. 5 to the coupling capacitor C11 and the transmit amplifier. Capacitor C10 serves to remove high frequency harmonics.

The incoming AC signal from line appears across the potential divider R29 and R40, and is also applied to the input of the receive amplifier (pin 2 of speech ic 182) by R34 and C17 which provides some low frequency roll-off. The gain of the receive amplifier is fixed and the level to the ear piece is therefore determined by the potential divider. Although the speech chip 182 has its own internal signal limitation, it may operate at too high a voltage for most receivers. Therefore Diodes D17 and D18 clamp the signal at approximately 110–117 dBPa sound pressure level.

The microcontroller 14 controls TR9, TR10 in the volume boost circuit 181 and TR11. When the mute key on the keypad 161 shown in FIG. 5 is pressed for a short period TR11 is turned on which mutes the voice transmission of the telephone. When the mute key is again pressed for a short period TR11 is turned off again and transmission is re-enabled. Longer operations of the Mute key turn TR11 on and also make the microcontroller 14 sequence through a cycle where first TR9 turns on, then TR9 turns off and TR10 turns on, then both TR9 and TR10 turn on and then both turn off. This cycle is repeated until the key is released. The transistors remain in the state they were when the key is released. When TR9 and/or TR10 turn on, they connect a resistance in parallel with R29. This increases the received level at pin 2 of the speech circuit IC 182.

As the sequence progresses the level increases through three steps before returning to normal with both transistors off. As the sequence progresses the microcontroller 14 also generates a tone output at pin 42 shown in FIG. 5 which passes to the receive input of the speech chip 182. The user will then be given an indication of the volume level currently selected because the tone rises in pitch as the volume rises. It should be noted that the number of transistors used in the volume boost circuit 181 is not limited to two. More transistors can be used in a similar way.

The Mute pin serves to prevent loud clicks, or loud DTMF being heard in the earpiece 22 and also to disconnect the microphone 20 from the transmit amplifier when sending DTMF to line. When the mute pin is taken high by the microcontroller 14, the receiver is attenuated by approximately 70 dB and the microphone is cut off completely.

FIG. 5 shows the constant-current source 12, the circuitry of power-on reset circuit indicated by block 13 in FIG. 4, and the dialler circuit 16.

A DTMF generator chip 162, microcontroller 14 and EEPROM 26 take their supply current via a constant current regulator 12 formed by R8, D8, D9, D21, TR3, R9 and switching diodes D6 and D7. A maximum voltage is maintained by zener diode D13. Capacitor C22 provides a keep-alive to the dialler chip during momentary breaks from line. Tone or pulse operation is selected by SW3. An alternative method is that SW3 is omitted from the circuit and the E$^2$PROM 26 is programmed with the Tone/Pulse key on the keypad 161. Pin 9 on the microcontroller 14 is the hook switch detection pin and is operated by the potential divider R5, R6 and D19. A high signal at Pin 9 indicates off hook or the active mode for the microcontoller 14. The purpose of C19 is to prevent spikes appearing at Pin 9 from affecting the hook state of the microcontroller. Off line memory retention for last number redial and ten number memory is by virtue of there being E$^2$PROM 26 present which retains the information even when no power is available.

For DTMF operation, a momentary select key on the keypad 161, or alternatively a mechanically latching switch S3, is switched to DTMF. Dialling on the keypad is unlikely to exceed the rate at which DTMF is sent to line. However, if it does, these digits will be buffered in an internal register. At the end of dialling, if it is wished to redial the same number, the operator can go on hook, off hook again, then press the last number redial key. The entire number will be recalled from the redial memory and sent to line at the rate programmed into the E$^2$PROM 26.

For Pulse dialling, the select key is switched to loop disconnect. When keypad entries are made, they are very likely to exceed the rate at which dial pulses can be sent to line (10 pulses per second) and are therefore stored in the internal register as they are dialled. Digits will be sent with a break period, make period and an inter-digit pause as programmed in the E$^2$PROM 26. A pre-digit pause is also programmed into the E$^2$PROM, after which the mask pin (pin 29) will go low. This has the effect of turning off Transistors TR2 and TR7, thereby disconnecting the speech circuit from line. Simultaneously, pin 30, the impulse output, goes high, turning on transistor TR1 and drawing current through resistor R7 and D5. R7 and TR1 imitate quite closely the DC parameters of the speech circuit itself. Pulse dialling then occurs by switching on and off pin 30 at the dialling rate. After the completion of the dialling string there is a pause which is programmed into the E$^2$PROM and then the situation reverts to normal.

The clock control circuit 141 for the microcontroller 14 is an external ceramic resonator X2 at a frequency of 1 MHz. Capacitors C8 and C9 prevent the ceramic resonator passing into a spurious frequency.

It is understood that in FIG. 5 all the electronic components not included in the dash blocks 12, 16, 141 or the solid blocks 26, 14, 18 form a power-on reset circuit which is noted above, is represented by block 13 in FIG. 4. The functions of this circuit will be explained now.

If the telephone is taken off-hook with C7 and C22 discharged, then the power-on reset circuit operates to enable the telephone to become operational within approximately 0.75 seconds of coming off-hook. If the instrument has not been used for a short while, the following sequence of events occurs. When going off hook, TR5 is turned off because the gate source voltage is less than 2 V due to the low voltage of C7 and C22. TR6 is therefore turned on via R16, effectively taking the connecting Vcc to the positive side of BR1. This causes Vcc to rise rapidly and as it does, TR5 then turns on, which turns TR6 Off. TR6 only turns off, though, once Vcc is high enough for the microcontroller to operate. At the same time TR12 turns on which holds the reset pin of the microcontroller and the chip enable pin of the DTMF generator (pin 2) low. This prevents any spurious tones being generated by the phone as Vcc rises. When Vcc is high enough for the microcontroller 14 to operate, pin 29 goes high, thus turning TR2 on and allowing current to flow through the constant current source. TR7 also turns on, thus providing current to the speech chip.

It is at this point that the phone becomes operational. The telephone is now in its normal full-operational state. D15 protects the gate of TR6. (Max voltage 20 V wrt. source).

We claim:

1. A telephone comprising a receiver; a transmitter including a microphone; a speech circuit: a microcontroller for controlling the operation of the telephone; means for storing a selected gain for said receiver; and switch means selectively actuable by a user for increasing the gain of the receiver to said selected gain and simultaneously automatically cutting off the microphone.

2. A telephone according to claim 1, having user operable means for varying said selected gain.

3. A telephone according to claim 1, having user operable mute means for automatically cutting off the microphone without increasing the gain of the receiver.

* * * * *